(12) United States Patent
Li et al.

(10) Patent No.: US 8,970,786 B2
(45) Date of Patent: *Mar. 3, 2015

(54) AMBIENT LIGHT EFFECTS BASED ON VIDEO VIA HOME AUTOMATION

(71) Applicant: Sony Corporation, Tokyo (JP)

(72) Inventors: Adam Li, Solana Beach, CA (US); Megan Farrell, San Diego, CA (US); Aixin Liu, San Diego, CA (US); Djung Nguyen, San Diego, CA (US)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/156,344

(22) Filed: Jan. 15, 2014

(65) Prior Publication Data
US 2014/0142762 A1    May 22, 2014

Related U.S. Application Data

(63) Continuation of application No. 13/654,255, filed on Oct. 17, 2012.

(51) Int. Cl.
*H04N 5/57* (2006.01)
*H04N 5/56* (2006.01)
(Continued)

(52) U.S. Cl.
CPC .......... *G05B 15/02* (2013.01); *H04N 21/42202* (2013.01); *H04N 21/43* (2013.01);
(Continued)

(58) Field of Classification Search
USPC .............. 348/602, 474, 453, 450, 423.1, 734, 348/719, 725, 366, 211.2, 14.02; 700/90; 715/700, 716, 719, 727, 762; 340/686.1, 545.1, 12.22; 725/123, 110, 725/105, 86, 81, 47, 44, 38, 20, 12
See application file for complete search history.

(56) References Cited

U.S. PATENT DOCUMENTS 5,061,997 A    10/1991    Rea
6,140,987 A    10/2000    Stein
(Continued)

FOREIGN PATENT DOCUMENTS

WO    2012027643 A2    3/2012

OTHER PUBLICATIONS

Non-Final Office Action from U.S. Appl. No. 13/654,255 dated Jun. 19, 2013.
(Continued)

*Primary Examiner* — Jefferey Harold
*Assistant Examiner* — Mustafizur Rahman
(74) *Attorney, Agent, or Firm* — Fitch, Even, Tabin & Flannery LLP

(57) ABSTRACT

A system for controlling ambient light effects comprises a receiving device including at least one processor programmed to parse incoming video content to detect at least one portion of the incoming video content and determine at least one ambient light effect to be associated with the portion of the video content. The system further comprises a home automation controller in communication with the processor and at least one lighting device in communication with the receiving device and the home automation controller. The processor of the receiving device is programmed to send a command to the home automation controller specifying the ambient light effect determined by the processor to be associated with the portion of the video content. The lighting device generates the ambient light effect specified in the command when the portion of the video content is displayed to a user.

20 Claims, 2 Drawing Sheets

(51) Int. Cl.
*G05B 15/02* (2006.01)
*H04N 21/422* (2011.01)
*H04N 21/43* (2011.01)
*H04N 21/431* (2011.01)
*H04N 21/81* (2011.01)
*H05B 37/02* (2006.01)
*H04N 9/73* (2006.01)

(52) U.S. Cl.
CPC .......... *H04N21/4318* (2013.01); *H04N 21/81* (2013.01); *H05B 37/02* (2013.01); *H04N 9/73* (2013.01); *A63F 2300/308* (2013.01)
USPC .......... 348/602; 348/734; 348/725; 348/719; 348/474; 348/453; 348/450; 348/423.1; 348/366; 348/211.2; 348/14.02; 715/700; 715/716; 715/719; 715/727; 715/762; 725/123; 725/110; 725/105; 725/86; 725/81; 725/47; 725/44; 725/38; 725/20; 725/12; 340/686.1; 340/545.1; 340/12.22; 700/90

(56) References Cited

U.S. PATENT DOCUMENTS

| | | | |
|---|---|---|---|
| 6,577,080 | B2 | 6/2003 | Lys |
| 6,611,297 | B1 | 8/2003 | Akashi |
| 7,180,529 | B2 | 2/2007 | Covannon |
| 7,262,813 | B2 | 8/2007 | Sato |
| 7,369,903 | B2 | 5/2008 | Diederiks |
| 7,616,262 | B2 | 11/2009 | Eves |
| 7,859,595 | B2 | 12/2010 | Gutta |
| 7,894,000 | B2 | 2/2011 | Gutta |
| 7,932,953 | B2 * | 4/2011 | Gutta et al. .................. 348/602 |
| 8,063,992 | B2 | 11/2011 | Gutta |
| 8,143,813 | B2 * | 3/2012 | Aarts ............................ 315/307 |
| 8,576,340 | B1 | 11/2013 | Li |
| 2003/0057884 | A1 | 3/2003 | Dowling |
| 2005/0206788 | A1 | 9/2005 | Eves |
| 2006/0058925 | A1 | 3/2006 | Diederiks |
| 2006/0161270 | A1 | 7/2006 | Luskin |
| 2007/0055390 | A1 | 3/2007 | Simon |
| 2007/0091111 | A1 | 4/2007 | Gutta |
| 2007/0157281 | A1 | 7/2007 | Ellis |
| 2007/0174773 | A1 | 7/2007 | Abernethy |
| 2007/0242162 | A1 | 10/2007 | Gutta |
| 2007/0288849 | A1 | 12/2007 | Moorer |
| 2007/0288975 | A1 | 12/2007 | Cashman |
| 2008/0129821 | A1 | 6/2008 | Howarter |
| 2008/0174254 | A1 | 7/2008 | Abernethy |
| 2009/0109340 | A1 | 4/2009 | Iwanami |
| 2009/0123086 | A1 | 5/2009 | Iwanami |
| 2009/0175536 | A1 * | 7/2009 | Gutta et al. ................... 382/166 |
| 2009/0212939 | A1 * | 8/2009 | Richmond ................ 340/539.11 |
| 2009/0219305 | A1 | 9/2009 | Diederiks |
| 2009/0249428 | A1 | 10/2009 | White |
| 2010/0005062 | A1 | 1/2010 | Van Den Dungen |
| 2010/0052843 | A1 | 3/2010 | Cannistraro |
| 2010/0177247 | A1 | 7/2010 | Sekulovski |
| 2010/0213873 | A1 | 8/2010 | Picard |
| 2010/0231140 | A1 * | 9/2010 | Aarts ............................ 315/307 |
| 2010/0238664 | A1 * | 9/2010 | Steenbergen ................. 362/276 |
| 2010/0244745 | A1 | 9/2010 | Wendt |
| 2010/0262336 | A1 | 10/2010 | Rivas |
| 2010/0265414 | A1 * | 10/2010 | Nieuwlands ................... 348/739 |
| 2010/0289661 | A1 * | 11/2010 | Styers et al. ................ 340/686.1 |
| 2011/0075036 | A1 | 3/2011 | Galeazzi |
| 2011/0190911 | A1 | 8/2011 | Iwanami |
| 2011/0245941 | A1 | 10/2011 | De Waele |
| 2012/0013257 | A1 | 1/2012 | Sibert |
| 2012/0068832 | A1 * | 3/2012 | Feldstein et al. ............. 340/12.5 |

OTHER PUBLICATIONS

Notice of Allowance from U.S. Appl. No. 13/654,213 dated Jun. 18, 2013.
Non-Final Office Action from U.S. Appl. No. 13/654,190 dated Jul. 17, 2013.
Non-Final Office Action from U.S. Appl. No. 13/654,190 mailed Jan. 22, 2014 (11 pgs.).
Notice of Allowance from U.S. Appl. No. 13/654,213 mailed Sep. 3, 2013 (7 pgs.).
Notice of Allowance from U.S. Appl. No. 13/654,255 mailed Nov. 20, 2013 (14 pgs.).
Notice of Allowance from U.S. Appl. No. 13/654,255 mailed Mar. 27, 2014 (12 pgs.).
Non-final Office Action from U.S. Appl. No. 13/654,279 mailed May 7, 2014 (20 pgs).
Notice of Allowance from U.S. Appl. No. 13/654,255 mailed Jul. 22, 2014(11 pgs.).
Final office action from U.S. Appl. No. 13/654,190 mailed Jul. 17, 2014 (29 pgs.).
Non-Final Office Action from U.S. Appl. No. 13/654,233 mailed Jul. 16, 2014 (14 pgs.).

* cited by examiner

AMBIENT LIGHT EFFECTS BASED ON VIDEO VIA HOME AUTOMATION

CROSS-REFERENCE TO RELATED APPLICATIONS

This application claims the benefit of the priority date and is a continuation of Ser. No. 13/654,255, filed on Oct. 17, 2012, which is hereby incorporated it is entirety by reference.

FIELD

This invention relates to ambient light effects, and more specifically, to ambient light effects generated via home automation systems based on information included in a video file.

BACKGROUND

Television programs, movies, and video games most commonly provide visual stimulation from a television screen display and audio stimulation from the speakers connected to the television. There are some known systems that attempt to enhance a viewer's/user's experience by providing a more interactive/responsive environment. For example, some video gaming systems cause lighting devices such as lamps to generate an ambient light effect ("ALE") during game play.

To provide an enjoyable interactive experience, the lighting devices need to generate the ambient light effects at appropriate times when the associated scene is displayed to a user. Thus, an ambient light effect-capable system needs to be able to identify one or more scenes during the display of which an ambient light effect is to be generated. One such system focuses on detecting and analyzing various parameters of the video file or video game application and generating ambient light effects based on the detected parameters. One problem with such an approach is that many video files and video games include various access restrictions imposed by the content providers, and such restrictions may make it difficult or impossible to analyze the parameters of a video file and/or video game.

Home automation systems provide networks for controlling various electrical devices such as lighting fixtures, garage door openers, home alarm systems, and the like. Home automation systems are not known to be integrated with electronic devices such as televisions, DVD players, or video game consoles to provide ambient light effects based on scenes or action sequences included in television programs, movies, and video games.

What is needed are systems and methods of producing ambient light effects in association with one or more portions of a video file that overcomes the aforementioned shortcomings.

SUMMARY

The present invention satisfies this need. In one embodiment, a system for controlling ambient light effects comprises a receiving device including at least one processor programmed to parse incoming video content to detect at least one portion of the incoming video content and determine at least one ambient light effect to be associated with the at least one portion of the video content. The system further includes at least one home automation controller in communication with the at least one processor. The system further includes at least one lighting device in communication with at least one of the receiving device and the home automation controller. The processor of the receiving device is programmed to send a command from the receiving device to the home automation controller, the command specifying the at least one ambient light effect determined by the at least one processor to be associated with the at least one portion of the video content. The at least one lighting device includes at least one hardware controller adapted to, after receiving the command from the home automation controller, to generate the at least one ambient light effect specified in the command.

The receiving device can be selected from one of a television, set-top box, disc player, personal computer, laptop, tablet computer, and mobile phone.

In one approach, the home automation controller is integrated into the receiving device. The receiving device and the home automation controller can be in communication with a common graphical interface. The graphical interface can include one or more options adapted to be configured by a user to control the at least one ambient light effect.

In another approach, the home automation controller is spaced apart from the receiving device.

The home automation controller can include a translator adapted to translate the command received by the home automation controller from the receiving device. The home automation controller can be in communication with the receiving device via one of a wired connection and wireless connection. The home automation component can be in communication with the at least one lighting device via one of a wired connection and wireless connection.

In one approach, the command by the processor identifies the at least one lighting device for generating the at least one ambient light effect specified in the command. In another approach, the command by the processor includes chrominance control data specifying at least one color of the ambient light effect to be generated by the at least one lighting device, the color being selected from red, green, blue, or combinations thereof. In yet another approach, the command includes data specifying brightness level of the at least one ambient light effect to be generated by the at least one lighting device. In still another approach, the command includes data specifying a predetermined time for generating the at least one ambient light effect by the at least one lighting device after receiving the command.

In an approach, the at least one lighting device is adapted to both interpret the command including chrominance control data and to generate the at least one color specified in the command.

The at least one home automation controller can be in communication with at least one electrical device not in communication with the receiving device or the at least one lighting device.

The systems and methods described herein provide an engaging experience to a user when watching television programming, movies, or playing video games. One advantage of the systems and methods described therein is that television programming, movies, and video games can be made more interactive for a user by including ambient light effects conveniently generated via the home automation system which can be in communication with practically any household lighting device. These and other advantages will be apparent upon consideration of the present specification.

DETAILED DESCRIPTION

Reference will now be made in detail to the present preferred embodiments of the invention, examples of which are illustrated in the accompanying drawings.

Generally, systems and methods are described herein for providing ambient light effects for a user when watching television programming, movies, or playing video games. The ambient light effects can be generated by one or more lighting devices based on information included in the video file representing the television program, movie, or video game. The ambient light effects can be generated by a device receiving the video content and sending, via a home automation system controller, a command to one or more lighting fixtures determined for generating the ambient light effects. The home automation system controller can be integrated into the receiving device and can be located separately from the receiving device. The ambient light effects can be associated with various events or action sequences in the television program, movie, or video game, and can be customized by the user through an interactive graphical user interface.

Figure 1:
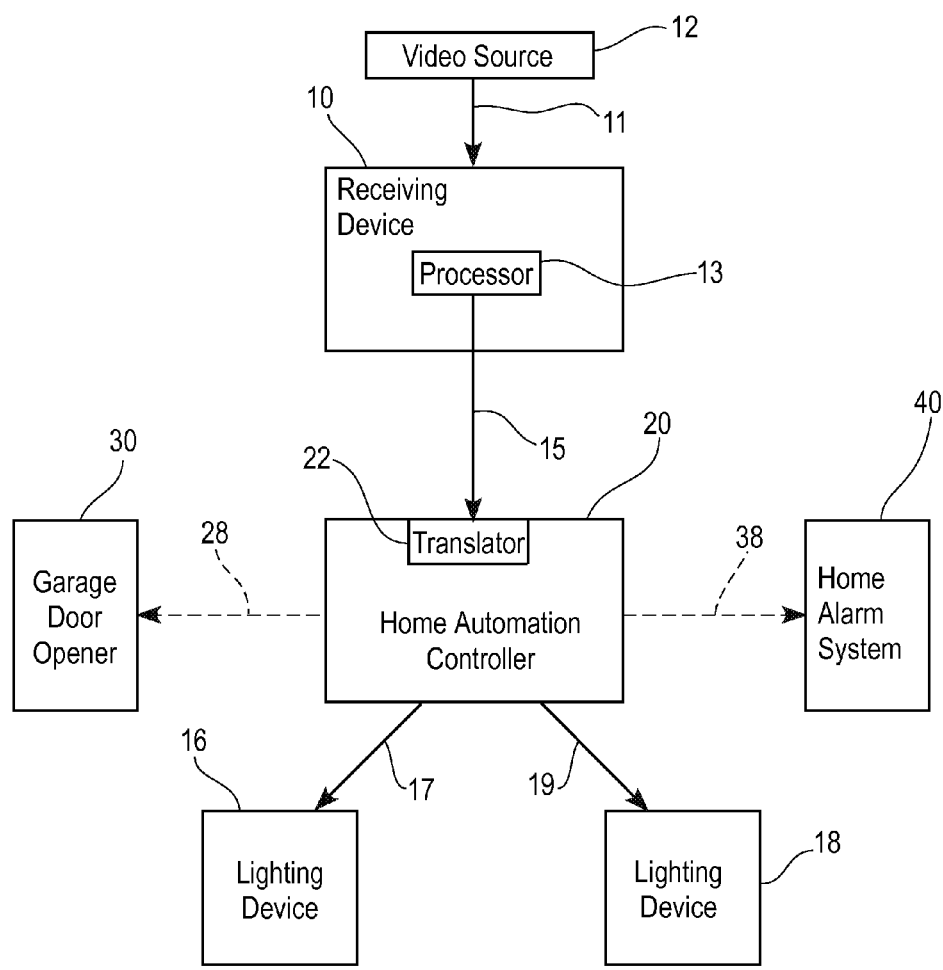
FIG. 1 is a schematic diagram of several exemplary devices of a system according to one embodiment.

One embodiment of a system according to the present invention is shown in FIG. 1, where a receiving device 10 is connected to two lighting devices 16 and 18 via a home automation controller 20.

The receiving device 10 receives television programming, movies, and video game content in the form of video files from a video source 12. The receiving device 10 shown in FIG. 1 can be a television, set-top box, optical disc player such as a DVD-player or Blu-Ray player, portable media player, personal computer, laptop, tablet computer, gaming console, mobile phone, and the like. The video source 12 can be any source capable of providing digital video files via a connection 11 to the receiving device 10. The video source 12 can be a cable head-end, a DVD or Blu-Ray disc, a video game disc, hard drive, or a digital media server capable of streaming to the receiving device. Although the connection 11 between the receiving device 10 and the video source 12 is preferably a wired connection, it is to be appreciated that the connection 11 between the receiving device 10 and the video source 12 can also be wireless.

The receiving device 10 may include a processor 13 that is programmed to parse an incoming digital video signal or digital video file incoming from the video source 12 to detect at least one portion of the incoming video content and determine at least one ambient light effect to be associated with the at least one portion of the video content. For purposes of this application, the term "processor" will be understood to mean any hardware component capable of parsing a digital video signal or digital video file incoming into the receiving device 10 from the video source 12. For example, the processor 13 may be a graphics card, a decoder, or the like.

The processor 13 of the receiving device 10 is also programmed to generate and send one or more commands to one or more lighting devices (16, 18, or both) to generate the one or more of the ambient light effects determined by the processor 13 to be associated with various portions of the video content from the video source 12. For example only, the processor 13 can cause the receiving device 10 to send a first command to the lighting device 16 to generate a first ambient light effect associated with a first portion of the incoming video content, and a second command to the lighting device 18 to generate a second ambient light effect associated with a second portion of the video content. The first and second ambient light effects may be the same or different.

In one approach shown in FIG. 1, the home automation system controller 20 is a physical device located separate from the receiving device 10 and connected to the receiving device 10 via a connection 15. The home automation controller 20 is in turn connected to the lighting devices 16 and 18 via connections 17 and 19, respectively. The connections 15, 17 and 19 can be wired or wireless connections.

As shown in FIG. 1, the home automation controller 20 includes a hardware component such as a decoder or translator 22 programmed to translate the commands sent to the home automation controller 20 by the processor 13 of the receiving device 10. Optionally, each of the lighting devices 16 and 18 may include a decoder or translator similar to the translator 22 to permit the lighting devices 16 and 18 to translate the commands sent to the lighting devices 16 and 18 by the home automation controller 20.

The receipt of the commands by the lighting devices 16 and 18 causes the lighting devices 16 and 18 to generate the ambient light effects specified in the commands generated by the processor 13. As such, the ambient light effects specified in the commands are generated by the lighting devices 16 and 18, preferably when the one or more portions of the video content associated with the one or more ambient light effects specified in the commands are displayed to the user. The generation of the ambient light effects by the lighting devices 16 and 18 in association with scenes, action sequences, or events specified in the commands generated by the processor 13 creates an enhanced and visually pleasing experience for a user watching a television program, a movie, or playing a video game.

In one exemplary approach shown in FIG. 1, the home automation controller 20 is in communication via lines 28 and 38 with devices such as garage door opener 30 and home alarm system 40, respectively. The communication lines 28 and 38 are indicated in dashed lines to indicate that the processor 13 of the receiving device 10 cannot communicate with either the garage door opener 30 or the home alarm system 40 via the communications lines 28 and 38.

Figure 2:
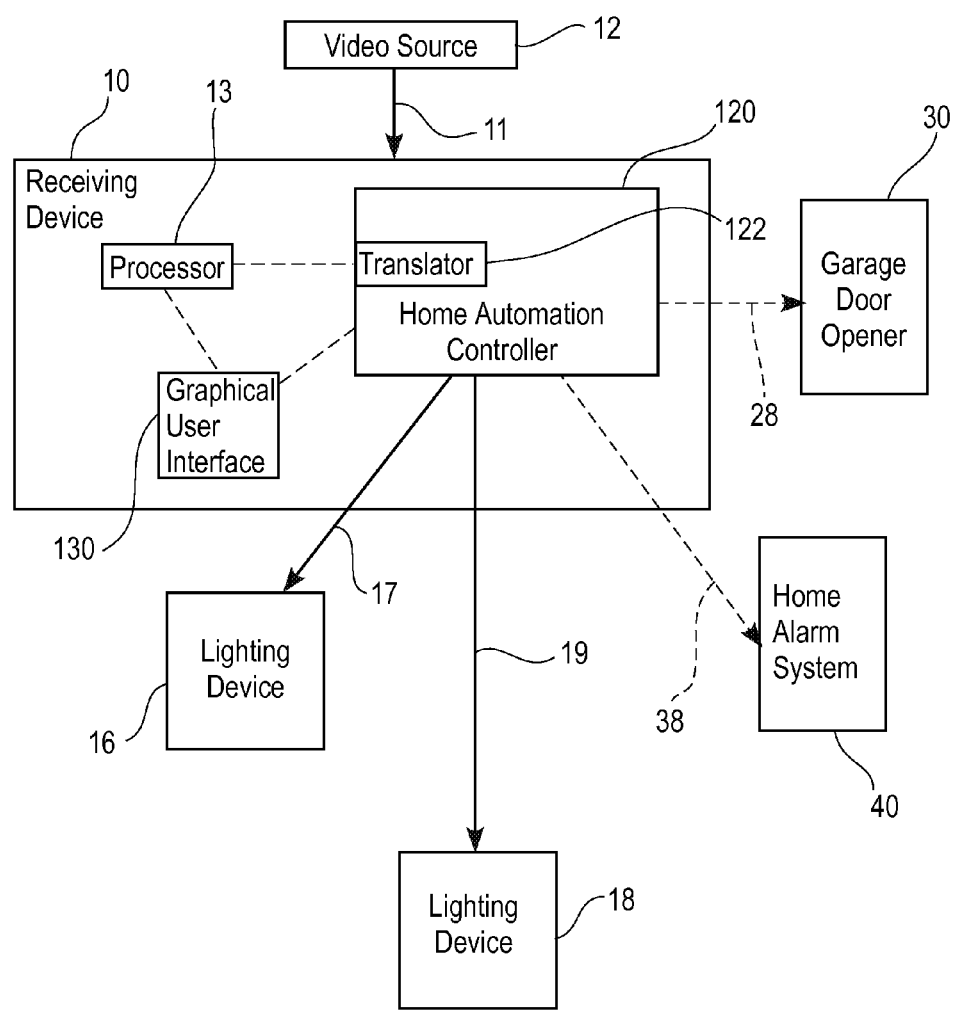
FIG. 2 is a schematic diagram of several exemplary devices of a system according to another embodiment.

In another approach shown in FIG. 2, the home automation controller 120 can be integrated into the receiving device 10. In one approach, the system includes a graphical user interface 130 such that the processor 13 and the home automation controller 120 can communicate via the common user interface 130. The graphical user interface includes one or more options adapted to be configured by a user to control and customize various aspects of the at least one ambient light effect specified in a command ultimately received by the lighting devices 16 and 18 from the processor 13

Referring to FIG. 2, the home automation controller 120, similar to the home automation controller 20, can include a hardware component such as a decoder or translator 122 programmed to translate the commands sent to the home automation controller 120 by the processor 13. Optionally, each of the lighting devices 16 and 18 may include a decoder or translator similar to the translator 122 to permit the lighting devices 16 and 18 to translate the commands sent to the lighting devices 16 and 18 by the home automation controller 120.

With further reference to FIG. 2, similarly to the home automation controller of 20, the home automation controller 120, in addition to being in communication with the lighting devices 16 and 18 ultimately controlled by the processor 13, is in communication via lines 28 and 38 with devices such as garage door opener 30 and home alarm system 40, respectively. The communication lines 28 and 38 are indicated in dashed lines to indicate that the processor 13 of the receiving device 10 cannot communicate with either the garage door opener 30 or the home alarm system 40 via the communications lines 28 and 38.

The lighting devices 16 and 18 can be any type of household or commercial devices capable of producing visible light. For example only, the lighting devices may be stand-alone lamps, track lights, recessed lights, wall-mounted lights or the like. The lighting devices 16 and 18 are preferably adapted to be dimmed. The lighting devices 16 and 18 have been shown in FIG. 1 as being identical for example only, and it is to be appreciated that the receiving device 10 can be simultaneously connected to two, three, four, or more types of different lighting devices.

Further, it is to be appreciated that the receiving device 10 has been shown in FIG. 1 as being connected to two lighting devices 16 and 18 by way of example only, and that the receiving device 10 can be connected to any number of lighting devices suitable for a given room where the receiving device 10 is located. In one exemplary approach, the receiving device 10 may be connected to only one lighting device. In another approach, the receiving device 10 may be connected to four lighting devices each located in a corner of a room. In another approach, the receiving device 10 may be connected to at least two lighting devices located in front of a user, at least two lighting devices located on right and left sides of the user, and at least two lighting devices located behind the user so as to create a surround ambient light effect for the user.

With reference to both FIGS. 1 and 2, the commands sent by the processor 13 of the receiving device 10 to the home automation controllers 20 and 120 can identify a specific lighting device (16, 18, or both) for generating the at least one ambient light effect specified in the command.

In one aspect, the commands sent by the processor 13 of the receiving device 10 to the home automation controllers 20 and 120 can include chrominance control data specifying at least one color of the ambient light effect to be generated by the lighting devices 16 and 18. For example, the color can be selected from red, green, blue, or combinations thereof. In one approach, the lighting devices 16 and 18 can be adapted, for example by including a hardware component, a software component, or both, to interpret the command including chrominance control data and to generate the at least one color specified in the command received from the processor 13.

In one aspect, the command generated by the processor 13 can include data specifying brightness level of the at least one ambient light effect to be generated by the lighting devices 16 and 18. In another aspect, the command includes data specifying a predetermined time for generating the at least one ambient light effect by one or both of the lighting devices 16 and 18 after receiving the command.

The generation of the ambient light effects by the lighting devices 16 and 18 in association with scenes, action sequences, or events specified in the commands generated by the processor 13 and delivered via the home automation controllers 20 and 120 creates an enhanced and visually pleasing experience for a user watching a television program, a movie, or playing a video game.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

What is claimed is:

1. A receiving device for controlling ambient light effects, the device comprising:
   at least one processor configured to communicate with a home automation controller configured to communicate with at least one lighting device, the at least one processor programmed to:
   parse incoming video content to detect at least one portion of the incoming video content and determine at least one ambient light effect to be associated with the at least one portion of the incoming video content; and
   send a command to the home automation controller, the command specifying the at least one ambient light effect determined by the at least one processor to be associated with the at least one portion of the incoming video content.

2. The receiving device of claim 1, wherein the receiving device is at least one of a television, set-top box, disc player, video game console, personal computer, laptop, tablet computer, and mobile phone.

3. The receiving device of claim 1, wherein the home automation controller is integrated into a physical structure of the receiving device.

4. The receiving device of claim 3, wherein the receiving device includes a translator adapted to translate the command received by the home automation controller from the at least one processor.

5. The receiving device of claim 3, further comprising a graphical interface in communication with the at least one processor and the home automation controller, the graphical interface including one or more options adapted to be configured by a user to control the at least one ambient light effect.

6. The receiving device of claim 1, wherein the command identifies the at least one lighting device for generating the at least one ambient light effect specified in the command.

7. The receiving device of claim 1, wherein the receiving device is a television separate from the home automation controller and the at least one processor is internal to the television and programmed to parse incoming video content selected from at least one of a television program, a movie, and a video game.

8. A home automation controller for controlling ambient light effects, the home automation controller being adapted to:
   receive a command from a receiving device in communication with the home automation controller, the command specifying at least one ambient light effect to be associated with at least one portion of video content received by the receiving device; and
   send the command to the at least one lighting device in communication with the home automation controller to generate the at least one ambient light effect specified in the command when the at least one portion of the video content is displayed to a user.

9. The home automation controller of claim 8, wherein the home automation controller includes a translator adapted to translate the command received by the home automation controller from the receiving device.

10. The home automation controller of claim 8, wherein the home automation controller is in communication with the receiving device via one of a wired connection and a wireless connection.

11. The home automation controller of claim 8, wherein the home automation controller is in communication with the at least one lighting device via one of a wired connection and a wireless connection.

12. The home automation controller of claim 8, wherein the at least one home automation controller is in communication with at least one electrical device that is not in communication with the receiving device or the at least one lighting device.

13. A method of controlling ambient light effects, the method comprising:
  parsing, by at least one processor of a receiving device, incoming video content to detect at least one portion of the incoming video content;
  determining, by the at least one processor of the receiving device, at least one ambient light effect to be associated with the at least one portion of the incoming video content;
  sending a command from the at least one processor of the receiving device to a home automation controller, the command specifying the at least one ambient light effect determined by the at least one processor to be associated with the at least one portion of the incoming video content; and
  in response to receiving the command from the home automation controller, generating, via at least one lighting device, the at least one ambient light effect specified in the command when the at least one portion of the incoming video content is displayed to a user.

14. The method of claim 13, wherein the sending the command includes sending the command identifying the at least one lighting device for generating the at least one ambient light effect specified in the command.

15. The method of claim 13, wherein the sending the command includes sending the command including chrominance control data specifying at least one color of the ambient light effect to be generated by the at least one lighting device, the color being selected from red, green, blue, or combinations thereof.

16. The method of claim 13, wherein the sending the command includes sending the command including data specifying brightness level of the at least one ambient light effect to be generated by the at least one lighting device.

17. The method of claim 13, wherein the sending the command includes sending the command including a predetermined time for generating the at least one ambient light effect by the at least one lighting device after receiving the command.

18. The method of claim 13, further comprising communicating, via the home automation controller, with at least one electrical device not in communication with the receiving device or the at least one lighting device.

19. The method of claim 13, wherein the sending the command from the at least one processor of the receiving device to the home automation controller further comprises translating the command received by the home automation controller from the receiving device.

20. The method of claim 13, wherein the generating, via at least one lighting device, the at least one ambient light effect specified in the command when the at least one portion of the video content is displayed to a user, further comprises both interpreting a command including chrominance control data specifying at least one color and generating the at least one color specified in the command.

* * * * *